(12) United States Patent
Münkel

(10) Patent No.: US 7,976,602 B2
(45) Date of Patent: Jul. 12, 2011

(54) FILTER, ESPECIALLY AIR FILTER

(75) Inventor: Karlheinz Münkel, Oberderdingen-Flehingen (DE)

(73) Assignee: Mann + Hummel GmbH, Ludwigsburg (DE)

( * ) Notice: Subject to any disclaimer, the term of this patent is extended or adjusted under 35 U.S.C. 154(b) by 395 days.

(21) Appl. No.: 12/110,470

(22) Filed: Apr. 28, 2008

(65) Prior Publication Data

US 2008/0276583 A1 Nov. 13, 2008

(30) Foreign Application Priority Data

May 8, 2007 (DE) .................. 20 2007 006 769 U

(51) Int. Cl.
*B01D 46/00* (2006.01)
*B01D 35/30* (2006.01)

(52) U.S. Cl. ............... 55/498; 55/478; 55/502; 55/510; 210/437; 210/441; 210/497.01

(58) Field of Classification Search .............. 55/498, 55/502, 503, 478, 480, 495, 504, 510; 210/497.01, 210/437, 441, 493.2

See application file for complete search history.

(56) References Cited

U.S. PATENT DOCUMENTS

| 4,836,923 | A | | 6/1989 | Popoff et al. | |
|---|---|---|---|---|---|
| 5,071,456 | A | * | 12/1991 | Binder et al. | 55/502 |
| 5,120,337 | A | * | 6/1992 | Benzler et al. | 55/482 |
| 5,547,480 | A | | 8/1996 | Coulonvaux | |
| 5,670,042 | A | | 9/1997 | Clausen et al. | |
| 5,755,843 | A | * | 5/1998 | Sundquist | 55/385.3 |
| 5,855,634 | A | * | 1/1999 | Berfield | 55/472 |
| 5,858,227 | A | * | 1/1999 | Stone et al. | 210/234 |
| 6,093,237 | A | * | 7/2000 | Keller et al. | 95/287 |
| 6,110,248 | A | * | 8/2000 | Liu | 55/490 |
| 6,419,718 | B1 | | 7/2002 | Klug et al. | |
| 6,988,625 | B2 | * | 1/2006 | Thomas et al. | 210/437 |
| 7,059,481 | B2 | * | 6/2006 | Kochert et al. | 210/437 |
| 7,090,708 | B2 | * | 8/2006 | Winter et al. | 55/357 |
| 7,311,748 | B2 | * | 12/2007 | Holmes et al. | 55/498 |
| 2003/0062301 | A1 | | 4/2003 | Merrie et al. | |
| 2005/0252852 | A1 | | 11/2005 | Bauder et al. | |
| 2009/0050121 | A1 | * | 2/2009 | Holzmann et al. | 123/573 |

FOREIGN PATENT DOCUMENTS

| DE | 4427753 A1 | 2/1996 |
|---|---|---|
| DE | 29808779 | 7/1998 |
| EP | 0232701 | 7/1989 |
| EP | 1222951 | 7/2002 |
| EP | 1595589 | 11/2005 |
| WO | 95/00232 | 1/1995 |
| WO | 02/31340 | 4/2002 |

* cited by examiner

*Primary Examiner* — Robert A Clemente

(57) ABSTRACT

A filter has a housing and a filter element with a first filter medium, wherein the filter element is arranged in the housing. A releasable lid is provided at an end face of the housing and closes off the housing. The releasable lid and the filter element together form a unitary component and the releasable lid forms a terminal disk at a first end of the filter element. The releasable lid forming the terminal disk of the filter element is glued to an end face of the first filter medium. The unitary construction of the filter element and the lid simplifies changing the filter element.

18 Claims, 5 Drawing Sheets

FILTER, ESPECIALLY AIR FILTER

BACKGROUND OF THE INVENTION

The invention relates to a filter, in particular an air filter, comprising a housing and a filter element with a filter medium which filter element is arranged in the housing. In the area of an end face the housing is provided with a releasable lid by means of which the housing can be opened or closed.

In U.S. Pat. No. 5,547,480 an air filter is disclosed that comprises a cylindrical housing in which a filter element is arranged. The cylindrical wall of the housing has an air intake socket that opens into an annular chamber surrounding the filter element. One end face of the housing is provided with an air outlet socket that is in communication with the interior that is formed within the filter element. At the other end face of the housing there is a removable lid that is securable by means of clamp-like brackets on the cylindrical housing part. By releasing the brackets and removing the lid, the filter element can be removed and replaced with a new filter element. The filter element is comprised of a drum-shaped filter medium provided at its end faces with terminal disks that rest fluid-tightly against end faces of the housing or the lid.

SUMMARY OF THE INVENTION

It is an object of the present invention to provide a filter of the aforementioned kind with which the change of the filter element can be performed in a simple and safe way.

In accordance with the present invention, this is achieved in that the releasable lid and the filter element together form a common (unitary) component and in that the lid is designed as a terminal disk of the filter element.

Because the releasable lid and the filter element form a common or unitary component and at the same time the releasable lid is designed as a terminal disk of the filter element, the filter element is removed when the lid is removed so that only a single handling step is required. When inserting a new filter element, the lid is already provided on the filter element so that when the filter element is completely inserted into the housing the housing is already fluid-tightly closed. This simplifies not only the assembly but also assembly errors are prevented.

According to an expedient embodiment of the invention the lid that provides the terminal disk of the filter element is glued to the end face of the filter medium. In this way, a fluid-tight connection of the filter medium and the lid is provided. Moreover, it is advantageous that the lid has an axial socket that is received in a tubular section of a housing part and is sealed relative to it. This not only provides a safe securing action but at the same time also a sealing action relative to the housing part. In this connection it is advantageous that as a seal two annular beads are provided on the outer wall of the socket so that no additional sealing elements are required. In order to provide a defined position of the lid in the axial direction it is proposed that the lid comprises a radially outwardly oriented circumferential collar that rests against an end face of the housing.

According to a further embodiment of the present invention, the filter element has a substantially cylindrical support grid on which the filter medium is concentrically arranged. The support grid has the advantage that the filter medium in the radial direction as well as in the axial direction retains its shape precisely. It is furthermore advantageous that the support grid is dosed at the end neighboring the lid and forms part of the lid. This is achieved in that the part of the lid forming the terminal disk is designed as an annular element with a central opening and the closed end of the support grid fills out this opening. In this way it is possible to push the filter medium onto the support grid before joining the annular element and the support grid, to then place the annular element onto the end of the support grid, and to then provide a fixed (non-detachable) connection between the lid and the filter element by applying a suitable connecting means.

According to a further embodiment of the invention, within the support grid a safety element is arranged that is secured in a seal-tight way on an outlet socket. In this way it is prevented that through the outlet socket dirt can penetrate into the closed system when the filter element is damaged or is being exchanged. The safety element is comprised preferably of a further support grid and a further filter medium covering it. For facilitating manipulation when removing a soiled filter element and inserting a new filter element it is proposed that the lid is provided on its outer side with an arrangement for improved force introduction with regard to releasing or attaching the component.

While an air inlet socket is arranged at the outer surface of the housing, the outlet socket is expediently provided on the end face of the end of the housing facing away from lid an outlet socket and is concentrically arranged relative to the longitudinal axis of the housing. This outlet socket has advantageously an axially inwardly oriented section provided with an outer thread. This has the advantage that the filter element can be screwed onto the outer thread of the outlet socket when on the end of the support grid that is facing away from the lid an inner threat is provided. In this way a safe securing action for the filter element in the housing is provided.

Expediently, the support grid has at the second end facing away from the lid a radial flange that serves as a terminal disk correlated with this second end of the filter medium. The end of the filter medium is preferably connected to this terminal disk in the same way as to the annular element at the other end, i.e., preferably by an adhesive. The housing comprises expediently two, preferably however three, housing parts that are connected with one another in the area of their respective radial dividing planes. In this connection, it is possible to connect the housing parts mechanically with one another, in particular by a snap-on, locking or screwing connection. Such connections are releasable so that also the housing parts, as needed, can be detached from one another. In case that the housing parts are to be connected permanently to one another, i.e., they are non-releasable or non-detachable, the housing parts are preferably connected by welding or gluing with one another.

DESCRIPTION OF PREFERRED EMBODIMENTS

Figure 1:
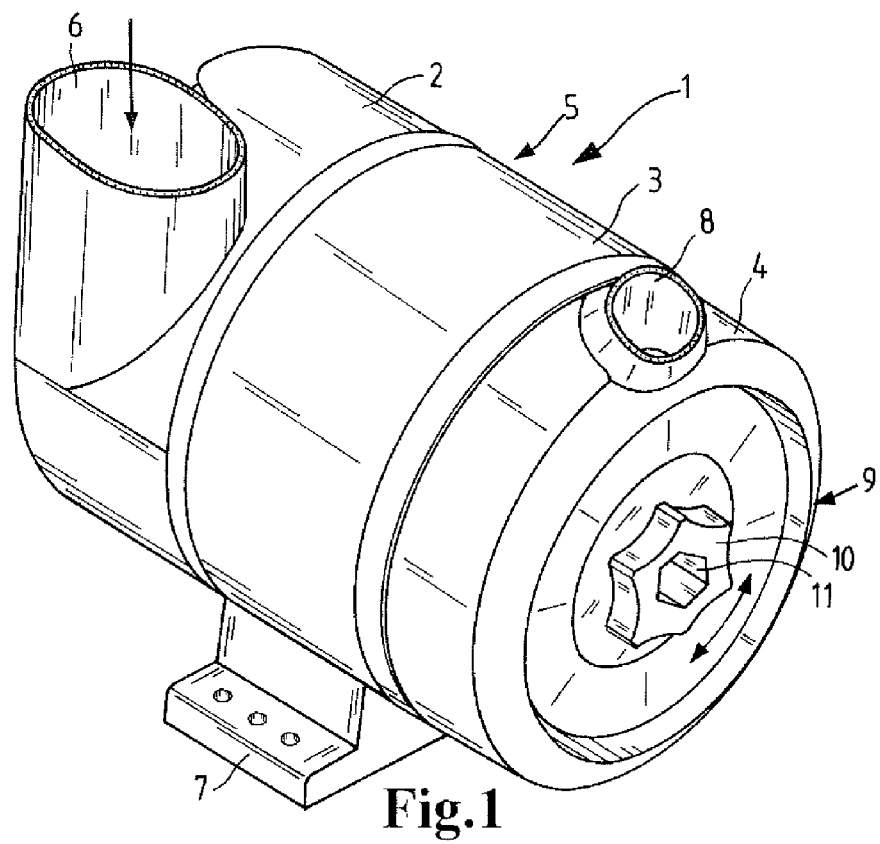
FIG. 1 is a perspective illustration of an air filter with closure lid.

FIG. 1 illustrates an air filter 1 that has a housing 5 comprised of three housing parts 2, 3, 4. On the housing part 2 an air inlet socket 6 is formed through which the airstream to be purified enters the housing 5. At the central housing part 3 a flange 7 is provided that serves for attaching the air filter 1. The housing part 4 has at its outer wall surface a vacuum socket 8 through which dust particles can be removed. The end face of the housing part 4 is closed off by a lid 9 on which a grip element 10 is provided. The grip element 10 has a substantially star-shaped outer contour and is provided centrally with a hexagon socket 11 provided for receiving a matching tool. The grip element 10 is thus an arrangement that serves for improving force introduction for turning the lid 9 by hand or by a tool.

Figure 2:
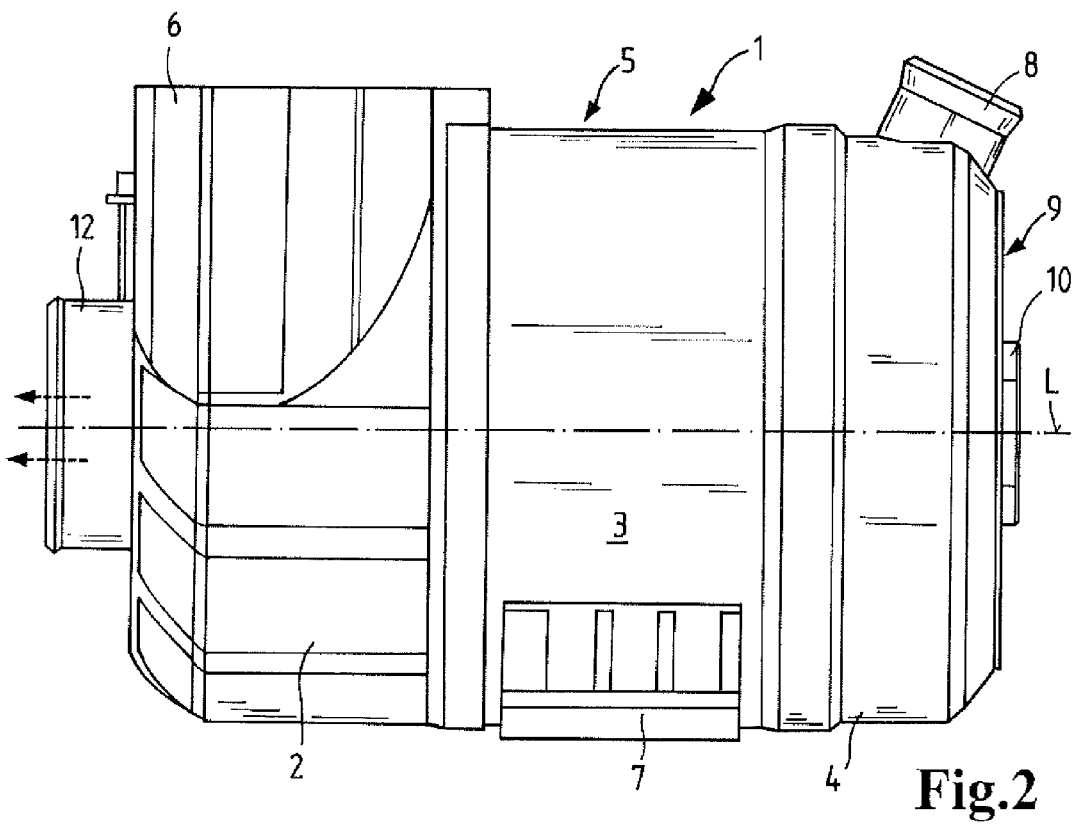
FIG. 2 is a view of the longitudinal side of the air filter housing.

FIG. 2 shows a view of the longitudinal side of the air filter 1 wherein L indicates the longitudinal axis of the housing 5. The housing 5 is comprised of the housing parts 2, 3, 4 with the air inlet socket 6, the flange 7, the vacuum socket 8 and the lid 9 with grip element 10. Moreover, this illustration shows an outlet socket 12 that is arranged concentrically to the longitudinal axis L.

Figure 3:
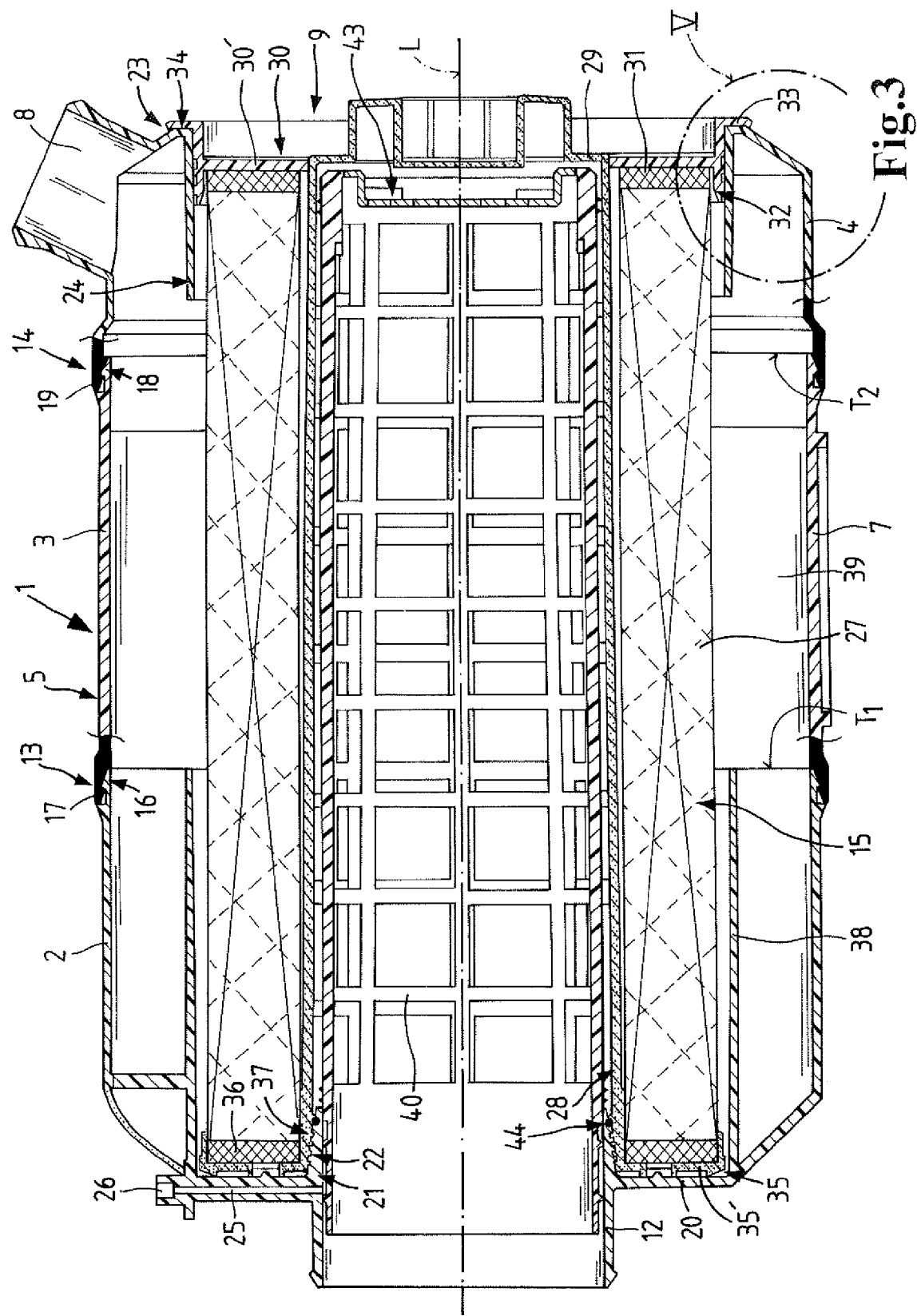
FIG. 3 is a longitudinal section of the air filter.

FIG. 3 shows a longitudinal section of the air filter 1 with the housing 5 comprised of the housing parts 2, 3, 4. The housing parts 2, 3, 4 have at their contacting surfaces radial dividing planes $T_1$ and $T_2$. Adjacent to these dividing planes $T_1$ and $T_2$ the housing parts 2, 3, 4 are provided with locking devices 13, 14 so that the housing parts 2, 3, and 4 can be mounted in a simple way. Since the locking devices 13, 14 extend about the circumference of the housing 5 and have mutually overlapping sections 16, 17 and 18, 19, this also provides fluid tightness of the housing 5.

On the housing part 2 an end wall 20 is formed that extends radially to the outlet socket 12 that is provided on the inner side of the end wall 20 with a section 21 projecting into the housing 5 and having an outer thread 22. Along the end wall 20 there is a radial channel 25 with a connecting opening 26 for connecting a pressure gauge (not illustrated). The housing part 4 has at its end face 23 an opening formed by an axial tubular section 24 that extends from the end face 23 coaxially to the longitudinal axis L into the housing 5.

In the housing 5 there is a filter element 15 which is essentially comprised of a filter medium 27 arranged on the support grid 28. The support grid 28 has at the end arranged within the tubular section 24 a closed end wall 29 that is positioned within an opening of an annular element 30 and that fills the annular element completely. The annular element 30 and the end wall 29 form together the lid 9 illustrated in FIG. 1. The annular element 30 also forms a terminal disk 30' of the filter element 15 and is fixedly connected to the filter medium 27 by an adhesive layer 31 and is sealed relative to it and the support grid 28. The annular element 30 has an axial section 32 that is secured in the tubular section 24 and is provided on its outer side with a circumferential collar 33 that rests against a surface 34 of the end face 23 of the housing 5.

At the end of the filter element 15 that is facing away from the lid 9 a radial flange 35 is arranged on the support grid 28which serves as a terminal disk 35' that is connected with the filter medium 27 also by an adhesive layer 36. The section of the support grid 28 neighboring the flange 35 is provided with an inner thread 37 so that the support grid 28 for securing the filter element 15 in the housing 5 can be screwed onto the thread 22. In the illustrated end position the lid 9 closes off the end face 23 located at the other end of the housing 5. FIG. 3 shows also that a coaxial cylindrical wall 38 is present within the housing part 2 by means of which the air stream entering through the air inlet socket is deflected so that the filter medium 27 is loaded uniformly with air across the entire length of the annular chamber 39 that surrounds the filter medium 27. Within the support grid 28 there is a safety element 43 with a further support grid 40 that is secured frictionally in the outlet socket 12.

Figure 4:
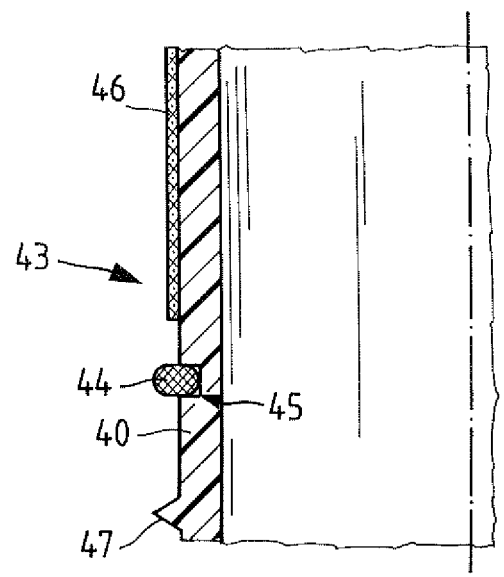
FIG. 4 is a detail view of a section of a safety element.

In FIG. 4 a section of the safety element 43 is shown in detail. The support grid 40 is provided on its outer surface with a filter medium 46 that is comprised of a thin material. It extends almost across the entire length of the support grid 40; only the area for attachment in the outlet socket 12 is spared. An annular groove 45 with a seal ring 44 is provided at this location for sealing the outlet socket 12. A thread 47 (only one turn is shown) is provided for attachment. The filter medium is glued on or welded on, for example, by ultrasound.

Figure 5:
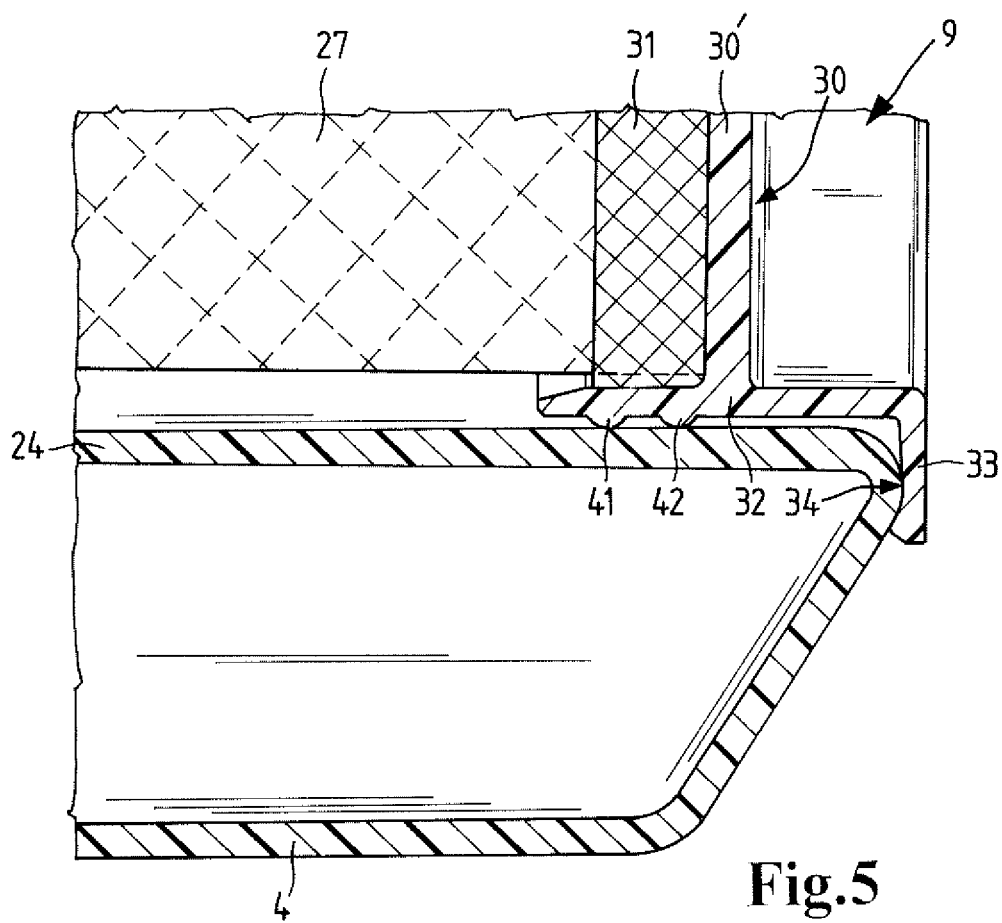
FIG. 5 is an illustration of the detail V of FIG. 3.

FIG. 5 shows the detail V of FIG. 3 at a larger scale. This illustration shows that in the housing part 4 the tubular section 24 is formed in which the axial section 32 of the annular element 30 is provided that is a component of the lid 9. The annular element 30 forms the terminal disk 30' for the filter medium 27 that is connected to the terminal disk 30' by an adhesive layer 31. On the outer surface of the axial section 32 there are two annular beads 41, 42 that rest against the inner wall of the tubular section 24 and in this way provide two axial seals at an axial spacing relative to one another. At the end face of the housing part 4 a surface 34 is provided against which the collar 33 of the annular element 30 rests.

Figure 6:
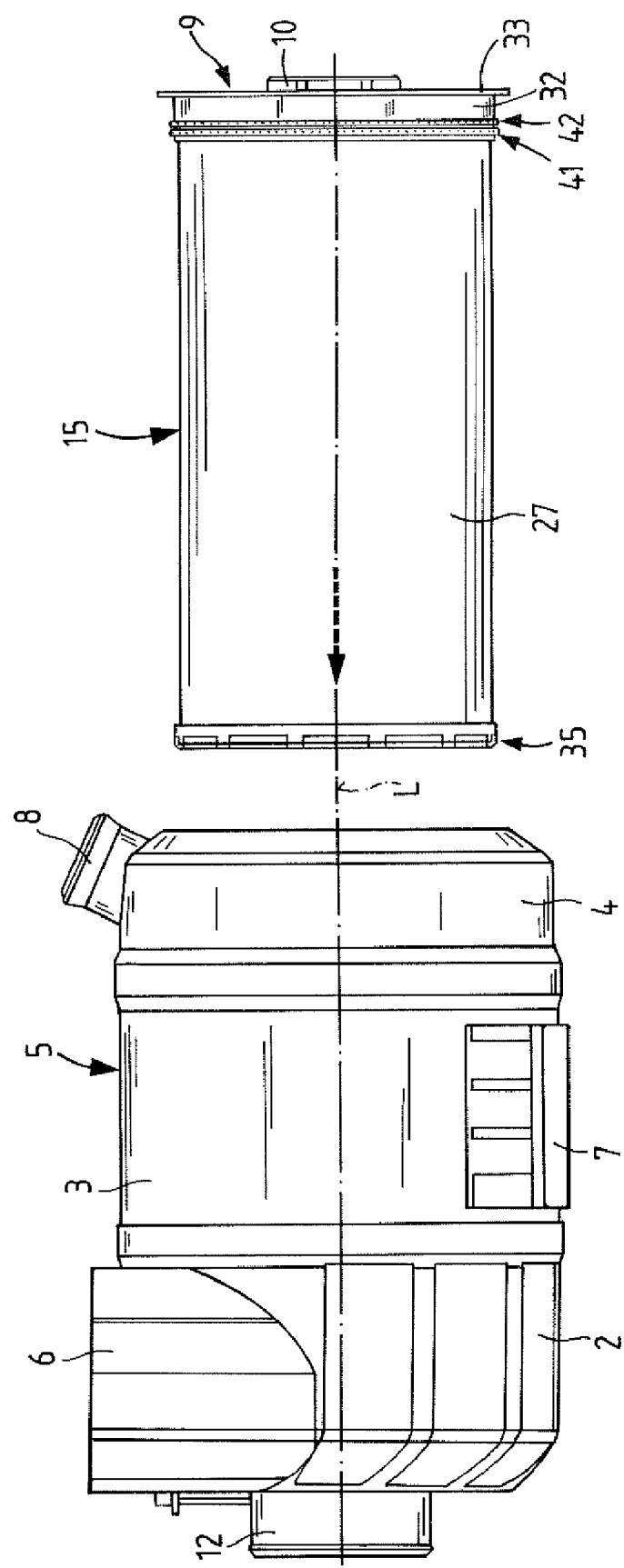
FIG. 6 shows the air filter housing according to FIG. 2 with a filter insert located outside of the housing.

FIG. 6 shows to the left the housing 5 according to the illustration in Fig. wherein same parts are identified by same reference numerals as in the afore described Figures. To the right in FIG. 5 the filter element 15 is illustrated in a position removed from the housing 5 or before being inserted into the housing 5. The filter element 15 is provided at one end with the lid 9 on which the grip element 10 is arranged. On the lid 9 an axial section 32 is integrally formed and provided with the annular beads 41 and 42. At the end of the filter element there is flange 35 that is connected to the filter medium 27. The filter element 15 and the lid 9 together form a unit so that for removing the filter element 15 from the housing 5 or for inserting it into the housing it is only necessary to handle a single component.

Figure 7:
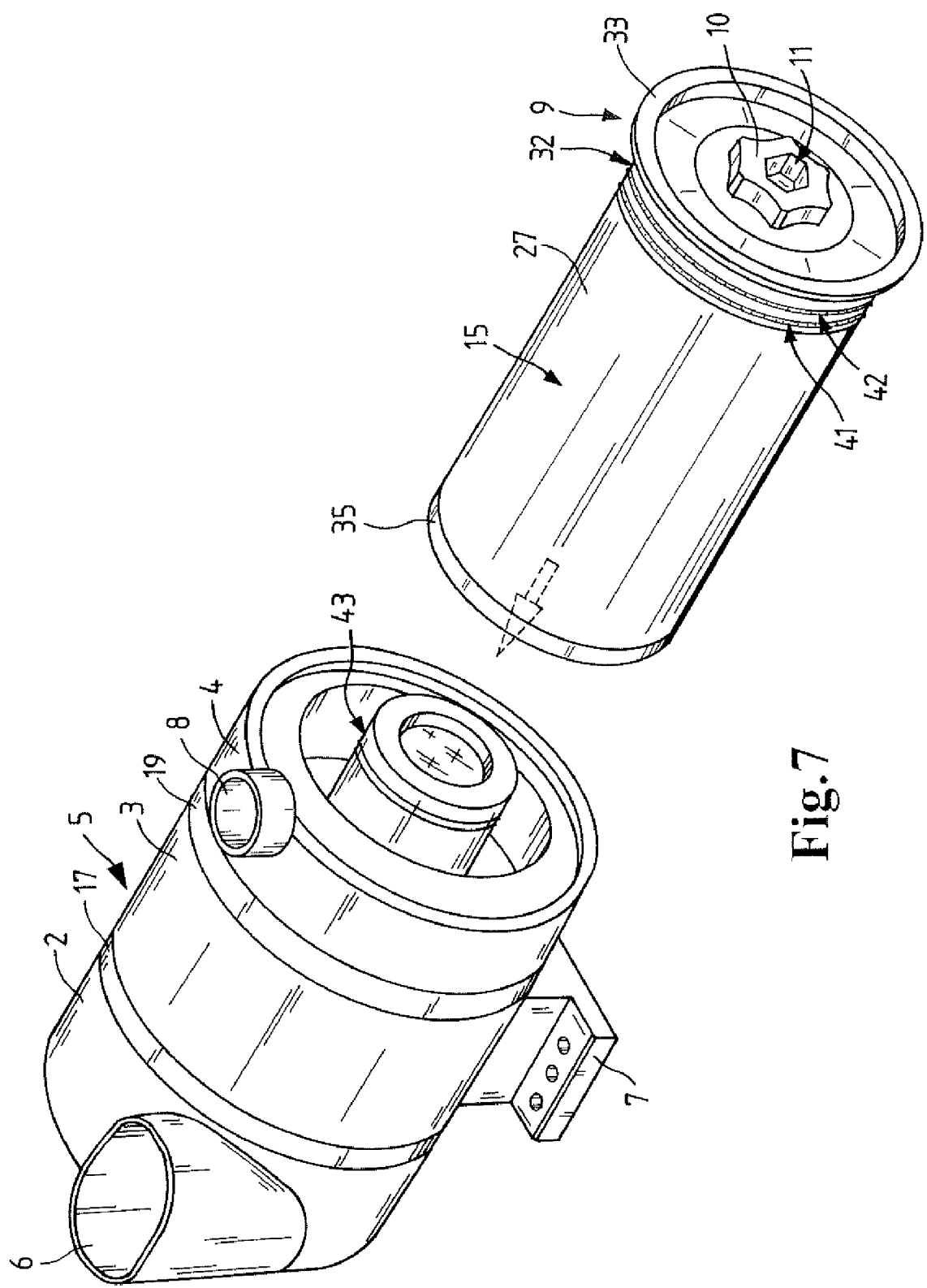
FIG. 7 is a perspective illustration of the air filter according to FIG. 6.

FIG. 7 shows a perspective illustration of the housing 5 with removed filter element 15. In the opening at the end face of the housing part 4 the forward end of the safety element 43 can be seen. When exchanging the filter element 15 the safety element 43 remains in its mounted position and covers thus the outlet socket on the housing part 2 in order to prevent penetration of dirt into the connected system. In the case of an installed but damaged filter element 15 the safety element 43 fulfills also such a function.

The specification incorporates by reference the entire disclosure of German priority document 20 2007 006 769.0 having a filing date of May 8, 2007.

While specific embodiments of the invention have been shown and described in detail to illustrate the inventive principles, it will be understood that the invention may be embodied otherwise without departing from such principles.

What is claimed is:

1. A filter comprising:
    a housing including an inlet socket and an outlet socket, wherein a medium to be filtered enters the inlet socket and said medium to be filtered exits the housing at the outlet socket after filtering;
    a filter element comprising
        a lid releasably and removably closing off an end face of said housing;
        a first support grid closed off at an end, said first support grid formed as a unitary part of said lid, said first support grid having a cylindrical shape terminating in a radially outwards extending flange at an end opposite said lid; and a first filter medium;
wherein the first filter medium is concentrically arranged on said first support grid;
wherein the filter element is arranged in the housing;
wherein the releasable lid and the filter element together form a unitary component;
wherein the releasable lid forms a terminal disk at a first end of the filter element;
wherein the lid has an axial socket and wherein the housing has a housing part with a tubular section with an inner wall;
wherein the axial socket is seal-tightly received in the tubular section, said tubular section sealing tight to said inner wall;
wherein said lid does not threadably engage said tubular section;
wherein the axial socket comprises monolithic annular beads disposed on an outer surface of the axial socket.

2. The filter according to claim 1, wherein the releasable lid forming the terminal disk of the filter element is glued to an end face of the first filter medium.

3. The filter according to claim 1, wherein the lid comprises a radially outwardly oriented circumferential collar that rests against a surface of the end face of the housing.

4. The filter according to claim 1, wherein
a part of the lid forming the terminal disk is an annular element with a central opening and
wherein the closed-off end of the first support grid fills out the central opening.

5. The filter according to claim 1, further comprising a safety element that is arranged within the first support grid and is secured seal-tightly on an outlet socket of the housing.

6. The filter according to claim 5, wherein the safety element is comprised of a second support grid and a second filter medium covering the second support grid.

7. The filter according to claim 1, wherein the lid has an outer side and the outer side is provided with an arrangement for improved force introduction for releasing or fastening the lid.

8. The filter according to claim 1, wherein said outlet socket is arranged concentrically to a longitudinal axis of the housing on the end face of the end of the housing remote from the lid, said outlet socket including an axially inwardly oriented section extending into an interior of said housing.

9. The filter according to claim 1, wherein the first support grid at the end facing away from the lid has a radial flange that serves as a terminal disk at a second end of the filter element.

10. The filter according to claim 1, wherein the housing has at least two housing parts that are connected to one another in the area of a radial dividing plane, respectively.

11. The filter according to claim 10, wherein the at least two housing parts are mechanically connected to one another by a connection selected from the group consisting of a snap-on connection, a locking connection, or a screw connection.

12. The filter according to claim 10, wherein the housing parts are connected by welding or gluing.

13. A filter comprising:
a housing;
a filter element comprising a first filter medium, wherein the filter element is arranged in the housing; and
a releasable lid provided at an end face of the housing for closing off the housing;
wherein the releasable lid and the filter element together form a unitary component;
wherein the releasable lid forms a terminal disk at a first end of the filter element;
wherein on the end face of the end of the housing remote from the lid an outlet socket is arranged concentrically to a longitudinal axis of the housing;
wherein the outlet socket has an axially inwardly oriented section provided with an outer thread.

14. The filter according to claim 13, wherein
the filter element has a substantially cylindrical first support grid,
wherein the first filter medium is concentrically arranged on the first support grid,
wherein the end of the first support grid that is facing away from the lid has an inner thread and
wherein the outer thread of the axially inwardly oriented section of the outlet socket is screwed onto the inner thread.

15. A filter element comprising:
a lid configured to releaseably mount to and close off an end of a housing receiving said filter element, said lid comprising:
a first support grid closed off at an axial end, said first support grid a unitary part of said lid, said first support grid having a cylindrical shape terminating in a radially outwards extending flange at a support grid end opposite said lid;
an inner thread arranged on said support grid at said axial end having said flange, said inner thread for threadably mounting said filter element;
a radially arranged annular element having a central portion filled by said closed axial end of said support grid;
a circumferentially arranged axial section arranged on an outer perimeter of said annular element, said axial section extending axially proximate to an outer surface of said filter medium, wherein said axial section is not threaded;
a circumferential collar arranged on said axial section and extending radially outwards, said circumferential collar configured to rest against an end face of said filter housing; and
a first filter medium concentrically arranged on said first support grid;
wherein a first end face of said filter medium is secured to an inner side of said lid; and
wherein an opposing second end face of said filter medium is secured to said flange of said support grid.

16. The filter element according to claim 15, wherein
said axial section further comprises monolithic annular sealing beads disposed on an outer surface of said axial section.

17. The filter element according to claim 15, further comprising:
a grip element arranged on an outer side of said lid for improving force introduction for turning said lid.

18. The filter element according to claim 17, wherein
said grip element comprises:
a substantially star shaped outer contour; and
a hexagon socket provided centrally in said grip element, said hexagon socket for receiving a matching tool.

* * * * *